US010725987B2

(12) United States Patent
Wein et al.

(10) Patent No.: US 10,725,987 B2
(45) Date of Patent: Jul. 28, 2020

(54) FORCED ORDERING OF A DICTIONARY STORING ROW IDENTIFIER VALUES

(71) Applicants: David Wein, St. Paul, MN (US); Ivan Schreter, Malsch (DE); Mihnea Andrei, Issy les Moulineaux (FR); Martin Heidel, Walldorf (DE); Frank Benkstein, Karlsruhe (DE)

(72) Inventors: David Wein, St. Paul, MN (US); Ivan Schreter, Malsch (DE); Mihnea Andrei, Issy les Moulineaux (FR); Martin Heidel, Walldorf (DE); Frank Benkstein, Karlsruhe (DE)

(73) Assignee: SAP SE, Walldorf (DE)

( * ) Notice: Subject to any disclaimer, the term of this patent is extended or adjusted under 35 U.S.C. 154(b) by 981 days.

(21) Appl. No.: 14/553,892

(22) Filed: Nov. 25, 2014

(65) Prior Publication Data

US 2016/0147804 A1    May 26, 2016

(51) Int. Cl.
*G06F 16/22*   (2019.01)
*G06F 17/22*   (2006.01)
(Continued)

(52) U.S. Cl.
CPC ...... *G06F 16/2228* (2019.01); *G06F 16/2264* (2019.01); *G06F 16/24552* (2019.01); *G06F 16/283* (2019.01)

(58) Field of Classification Search
None
See application file for complete search history.

(56) References Cited

U.S. PATENT DOCUMENTS 5,222,235 A    6/1993  Hintz et al.
5,280,612 A    1/1994  Lorie et al.
(Continued)

FOREIGN PATENT DOCUMENTS

EP    2778961 A1    9/2014
WO    WO-0129690 A2    4/2001

OTHER PUBLICATIONS

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.
(Continued)

*Primary Examiner* — James Trujillo
*Assistant Examiner* — Kurt A Mueller
(74) *Attorney, Agent, or Firm* — Mintz Levin Cohn Ferris Glovsky and Popeo, P.C.

(57) ABSTRACT

The subject matter disclosed herein provides methods for the forced ordering of a dictionary based on row identifier values. A plurality of concurrent transactions can be handled in an in-memory database. At least one of the transactions can include at least one write operation to a dictionary. Each write operation can be assigned a row identifier (ID). At least one of the write operations can be written to the dictionary out of sequence. The sequence can be based on the row ID. Each row ID in the dictionary can be mapped to a corresponding value identifier in the dictionary. The dictionary can position the value identifiers so that the corresponding row IDs are in a sorted sequential order based on the row ID. Related apparatus, systems, techniques, and articles are also described.

19 Claims, 10 Drawing Sheets

(51) Int. Cl.
*G06F 16/84* (2019.01)
*G06F 16/28* (2019.01)
*G06F 16/2455* (2019.01)

(56) References Cited

U.S. PATENT DOCUMENTS

| | | | |
|---|---|---|---|
| 5,594,898 A | 1/1997 | Dalal et al. |
| 5,701,480 A | 12/1997 | Raz |
| 5,717,919 A | 2/1998 | Kodavalla et al. |
| 5,758,145 A | 5/1998 | Bhargava et al. |
| 5,794,229 A | 8/1998 | French et al. |
| 5,870,758 A | 2/1999 | Bamford et al. |
| 5,933,833 A | 8/1999 | Musashi |
| 6,070,165 A | 5/2000 | Whitmore |
| 6,275,830 B1 | 8/2001 | Muthukkaruppan et al. |
| 6,282,605 B1 | 8/2001 | Moore |
| 6,397,227 B1 | 5/2002 | Klein et al. |
| 6,453,313 B1 | 9/2002 | Klein et al. |
| 6,490,670 B1 | 12/2002 | Collins et al. |
| 6,567,407 B1 | 5/2003 | Mizukoshi |
| 6,606,617 B1 | 8/2003 | Bonner et al. |
| 6,668,263 B1 | 12/2003 | Cranston et al. |
| 6,754,653 B2 | 6/2004 | Bonner et al. |
| 6,865,577 B1 | 3/2005 | Sereda |
| 7,698,712 B2 | 4/2010 | Schreter |
| 7,761,434 B2 | 7/2010 | Surtani et al. |
| 8,024,296 B1 | 9/2011 | Gopinathan et al. |
| 8,161,024 B2 | 4/2012 | Renkes et al. |
| 8,170,981 B1 | 5/2012 | Tewksbary |
| 8,224,860 B2 | 7/2012 | Starkey |
| 8,364,648 B1 | 1/2013 | Sim-Tang |
| 8,510,344 B1 | 8/2013 | Briggs et al. |
| 8,650,583 B2 | 2/2014 | Schreter |
| 8,732,139 B2 | 5/2014 | Schreter |
| 8,768,891 B2 | 7/2014 | Schreter |
| 8,868,506 B1 | 10/2014 | Bhargava et al. |
| 9,058,268 B1 | 6/2015 | Ostiguy et al. |
| 9,098,522 B2 | 8/2015 | Lee et al. |
| 9,141,435 B2 | 9/2015 | Wein |
| 9,262,330 B2 | 2/2016 | Muthukumarasamy |
| 9,268,810 B2 | 2/2016 | Andrei et al. |
| 9,275,095 B2 | 3/2016 | Bhattacharjee et al. |
| 9,275,097 B2 | 3/2016 | DeLaFranier et al. |
| 9,305,046 B2 | 4/2016 | Bhattacharjee et al. |
| 9,372,743 B1 | 6/2016 | Sethi et al. |
| 9,430,274 B2 | 8/2016 | Zhang |
| 9,489,409 B2 | 11/2016 | Sharique et al. |
| 9,645,844 B2 | 5/2017 | Zhang |
| 9,665,609 B2 | 5/2017 | Andrei et al. |
| 9,811,577 B2 | 11/2017 | Martin et al. |
| 2001/0051944 A1 | 12/2001 | Lim et al. |
| 2002/0107837 A1 | 8/2002 | Osborne et al. |
| 2002/0156798 A1 | 10/2002 | Larue et al. |
| 2003/0028551 A1 | 2/2003 | Sutherland |
| 2003/0065652 A1 | 4/2003 | Spacey |
| 2003/0204534 A1 | 10/2003 | Hopeman et al. |
| 2003/0217075 A1 | 11/2003 | Nakano et al. |
| 2004/0034616 A1 | 2/2004 | Witkowski et al. |
| 2004/0054644 A1 | 3/2004 | Ganesh et al. |
| 2004/0064601 A1 | 4/2004 | Swanberg |
| 2004/0249838 A1 | 12/2004 | Hinshaw et al. |
| 2005/0027692 A1 | 2/2005 | Shyam et al. |
| 2005/0097266 A1 | 5/2005 | Factor et al. |
| 2005/0234868 A1 | 10/2005 | Terek et al. |
| 2006/0004833 A1 | 1/2006 | Trivedi et al. |
| 2006/0005191 A1 | 1/2006 | Boehm |
| 2006/0036655 A1 | 2/2006 | Lastovica |
| 2006/0206489 A1 | 9/2006 | Finnie et al. |
| 2007/0192360 A1 | 8/2007 | Prahlad et al. |
| 2008/0046444 A1 | 2/2008 | Fachan et al. |
| 2008/0183958 A1 | 7/2008 | Cheriton |
| 2008/0247729 A1 | 10/2008 | Park |
| 2009/0064160 A1 | 3/2009 | Larson et al. |
| 2009/0080523 A1 | 3/2009 | McDowell |
| 2009/0094236 A1 | 4/2009 | Renkes et al. |
| 2009/0254532 A1* | 10/2009 | Yang ............... G06F 17/30315 |
| 2009/0287703 A1 | 11/2009 | Furuya |
| 2009/0287737 A1 | 11/2009 | Hammerly |
| 2010/0082545 A1 | 4/2010 | Bhattacharjee et al. |
| 2010/0088309 A1 | 4/2010 | Petculescu et al. |
| 2010/0241812 A1 | 9/2010 | Bekoou |
| 2010/0281005 A1 | 11/2010 | Carlin et al. |
| 2010/0287143 A1 | 11/2010 | Di Carlo et al. |
| 2011/0010330 A1 | 1/2011 | McCline et al. |
| 2011/0060726 A1 | 3/2011 | Idicula et al. |
| 2011/0087854 A1 | 4/2011 | Rushworth et al. |
| 2011/0145835 A1 | 6/2011 | Rodrigues et al. |
| 2011/0153566 A1 | 6/2011 | Larson et al. |
| 2011/0252000 A1 | 10/2011 | Diaconu et al. |
| 2011/0270809 A1 | 11/2011 | Dinkar et al. |
| 2011/0276744 A1 | 11/2011 | Sengupta et al. |
| 2011/0302143 A1 | 12/2011 | Lomet |
| 2012/0011106 A1 | 1/2012 | Reid et al. |
| 2012/0047126 A1 | 2/2012 | Branscome et al. |
| 2012/0102006 A1 | 4/2012 | Larson et al. |
| 2012/0137081 A1 | 5/2012 | Shea |
| 2012/0179877 A1 | 7/2012 | Shriraman et al. |
| 2012/0191696 A1 | 7/2012 | Renkes et al. |
| 2012/0221528 A1 | 8/2012 | Renkes et al. |
| 2012/0233438 A1 | 9/2012 | Bak et al. |
| 2012/0265728 A1 | 10/2012 | Plattner et al. |
| 2012/0284228 A1 | 11/2012 | Ghosh et al. |
| 2013/0054936 A1 | 2/2013 | Davis |
| 2013/0060742 A1 | 3/2013 | Chang et al. |
| 2013/0091162 A1 | 4/2013 | Lewak |
| 2013/0097135 A1* | 4/2013 | Goldberg ............ G06F 17/30289 707/704 |
| 2013/0103655 A1 | 4/2013 | Fanghaenel et al. |
| 2013/0117247 A1 | 5/2013 | Schreter et al. |
| 2013/0166566 A1 | 6/2013 | Lemke et al. |
| 2013/0346378 A1 | 12/2013 | Tsirogiannis et al. |
| 2014/0025651 A1 | 1/2014 | Schreter |
| 2014/0101093 A1 | 4/2014 | Lanphear et al. |
| 2014/0136571 A1 | 5/2014 | Bonvin et al. |
| 2014/0214334 A1 | 7/2014 | Plattner et al. |
| 2014/0222418 A1* | 8/2014 | Richtarsky ........ G06F 17/30312 704/10 |
| 2014/0279930 A1 | 9/2014 | Gupta et al. |
| 2014/0279961 A1 | 9/2014 | Schreter et al. |
| 2015/0039573 A1 | 2/2015 | Bhattacharjee et al. |
| 2015/0089125 A1 | 3/2015 | Mukherjee et al. |
| 2015/0106382 A1 | 4/2015 | Liu et al. |
| 2015/0113026 A1 | 4/2015 | Sharique et al. |
| 2015/0142819 A1 | 5/2015 | Florendo et al. |
| 2015/0193264 A1 | 7/2015 | Hutton et al. |
| 2015/0261805 A1 | 9/2015 | Lee et al. |
| 2015/0278281 A1 | 10/2015 | Zhang |
| 2016/0103860 A1 | 4/2016 | Bhattacharjee et al. |
| 2016/0125022 A1 | 5/2016 | Rider et al. |
| 2016/0147445 A1 | 5/2016 | Schreter et al. |
| 2016/0147447 A1 | 5/2016 | Blanco et al. |
| 2016/0147448 A1 | 5/2016 | Schreter et al. |
| 2016/0147449 A1 | 5/2016 | Andrei et al. |
| 2016/0147457 A1 | 5/2016 | Legler et al. |
| 2016/0147459 A1 | 5/2016 | Wein et al. |
| 2016/0147617 A1 | 5/2016 | Lee et al. |
| 2016/0147618 A1 | 5/2016 | Lee et al. |
| 2016/0147750 A1 | 5/2016 | Blanco et al. |
| 2016/0147776 A1 | 5/2016 | Florendo et al. |
| 2016/0147778 A1 | 5/2016 | Schreter et al. |
| 2016/0147786 A1 | 5/2016 | Andrei et al. |
| 2016/0147801 A1 | 5/2016 | Wein et al. |
| 2016/0147804 A1 | 5/2016 | Wein et al. |
| 2016/0147806 A1 | 5/2016 | Blanco et al. |
| 2016/0147808 A1 | 5/2016 | Schreter et al. |
| 2016/0147809 A1 | 5/2016 | Schreter et al. |
| 2016/0147811 A1 | 5/2016 | Eluri et al. |
| 2016/0147812 A1 | 5/2016 | Andrei et al. |
| 2016/0147813 A1 | 5/2016 | Lee et al. |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |

(56) References Cited

U.S. PATENT DOCUMENTS

| | | | |
|---|---|---|---|
| 2016/0147858 | A1 | 5/2016 | Lee et al. |
| 2016/0147859 | A1 | 5/2016 | Lee et al. |
| 2016/0147861 | A1 | 5/2016 | Schreter et al. |
| 2016/0147862 | A1 | 5/2016 | Schreter et al. |
| 2016/0147904 | A1 | 5/2016 | Wein et al. |
| 2016/0147906 | A1 | 5/2016 | Schreter et al. |

OTHER PUBLICATIONS

Lemke, Christian, et al. "Speeding Up Queries in col. Stores." *Data Warehousing and Knowledge Discovery Lecture Notes in Computer Science* (2010): 117-29. Web. Apr. 21, 2016.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

"HANA database lectures—Outline Part 1 Motivation—Why main memory processing." Mar. 2014 (Mar. 2014). XP055197666. Web. Jun. 23, 2015.; URL:http://cse.yeditepe.edu.tr/-odemir/spring2014/cse415/HanaDatabase.pdf;.

"Optimistic concurrency control." Wikipedia: The Free Encyclopedia. Wikimedia Foundation, Inc., Jul. 19, 2014. Web. Mar. 3, 2016.

Extended European Search Report issued in European patent application No. 15003085.6, dated and received Apr. 1, 2016.

Jens Krueger et al. "Main Memory Databases for Enterprise Applications." Industrial Engineering and Engineering Management (IE&EM), 2011 IEEE 18th International Conference on, IEEE, Sep. 3, 2011 (Sep. 3, 2011), pp. 547-557, XP032056073.

Ailamaki, et al., "Weaving Relations for Cache Performance," Proceedings of the the Twenty-Seventh International Conference on Very Large Data Bases, Sep. 11-14, Orlando, FL, Jan. 1, 2001.

Hector Garcia-Molina, et al., "Database Systems The Second Complete Book Second Edition—Chapter 13—Secondary Storage Management," *Database Systems the Complete Book, second edition*, Jun. 15, 2008.

\* cited by examiner

| ValueID | RowPOS |
|---|---|
| 0 | 1 |
| 1 | 2 |
| 2 | 7 |
| 3 | 12 |
| 4 | 6 |
| 5 | 5 |

| ValueID | RowID |
|---|---|
| 0 | 2 |
| 1 | 3 |
| 2 | 5 |
| 3 | 6 |
| 4 | 7 |
| 5 | 8 |

| ValueID | RowID |
|---|---|
| 0 | 2 |
| 1 | 3 |
| 2 | 5 |
| 3 | 8 |
| 4 | 6 |
| 5 | 7 |

FORCED ORDERING OF A DICTIONARY STORING ROW IDENTIFIER VALUES

TECHNICAL FIELD

This disclosure relates generally to databases that utilize dictionary compression and, in particular, to the forced ordering of a dictionary based on row identifier values.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on storage media (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

In some examples of in-memory databases, a columnar table is composed of a delta part and a main part. The delta part receives changes to the table and stores these changes in a persistent log. Upon recovery, the delta part is rebuilt from the log. These in-memory databases use dictionaries to keep track of various transactions (e.g., a write operation) involving different rows of the table. Some dictionaries, such as traditional pushback dictionaries, append entries to the back of the dictionary based on the order in which they are written. Because these dictionaries are not sorted, the amount of time required to search for a particular row may become burdensome as the number of entries in the dictionary grows.

SUMMARY

Methods and apparatus, including computer program products, are provided for the forced ordering of a dictionary based on row identifier values.

In one aspect, a plurality of concurrent transactions is handled in an in-memory database. At least one of the transactions includes at least one write operation to a dictionary. Each write operation is assigned a row identifier (ID). At least one of the write operations is written to the dictionary out of sequence. The sequence is based on the row ID. Each row ID in the dictionary is mapped to a corresponding value identifier in the dictionary. The dictionary positions the value identifiers so that the corresponding row IDs are in a sorted sequential order based on the row ID.

The above methods, apparatus, and computer program products may, in some implementations, further include one or more of the following features.

The dictionary can include a transient portion having a plurality of consecutive row IDs. The consecutive row IDs can be associated with a base row ID and a base value ID. The base row ID and the base value ID can be representative of a starting point of the transient portion.

The base row ID and the base value ID can be persisted to the in-memory database. The remaining plurality of consecutive row IDs may not be persisted to the in-memory database.

The mapping can determine the corresponding value identifier for an incoming row ID by determining an offset of the incoming row ID from the base row ID and by adding the offset to the base value ID.

The dictionary can further include a persisted portion having a plurality of persisted row IDs. The persisted portion can be searched for an incoming row ID using a search mechanism. The search mechanism can be a binary search when the plurality of persisted row IDs are ordered. The search mechanism can be a hash table search when the plurality of persisted row IDs are not ordered.

An incoming row ID can be inserted into the dictionary based on the mapping.

A row position for the row ID can be obtained by searching an index dictionary using the corresponding value identifier for the row ID.

The at least one write operation may not include a delete operation.

A number of values in the transient portion can be persisted to the in-memory database.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in some implementations, by sorting the row identifier values in a row identifier dictionary, read and lookup operations can be quickly performed. Moreover, because row identifier values in a consecutive sequence can be quickly determined in accordance with a known relationship, the corresponding dictionary entries do not need to be persisted to main storage, thereby freeing space for other data structures.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 8 is a table showing row identifier assignments and row position assignments for write operations in a first delta store;

FIG. 9 is a table showing row identifier assignments row position assignments for write operations in a second delta store;

FIG. 10A is an unsorted dictionary of row identifier values;

FIG. 10B is a sorted dictionary of row identifier values;

FIG. 11 is an index dictionary; and

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Further, the current subject matter is related and is directed to many aspects as described herein and, in addition, in the following patent application filed concurrently herewith on Nov. 25, 2014 entitled: "In-Memory Database System Providing Lockless Read and Write Operations for OLAP and OLTP Transactions" by inventors Anil Kumar Goel, Ivan Schreter, Juchang Lee, Mihnea Andrei, the contents of which are hereby fully incorporated by reference.

Figure 1:
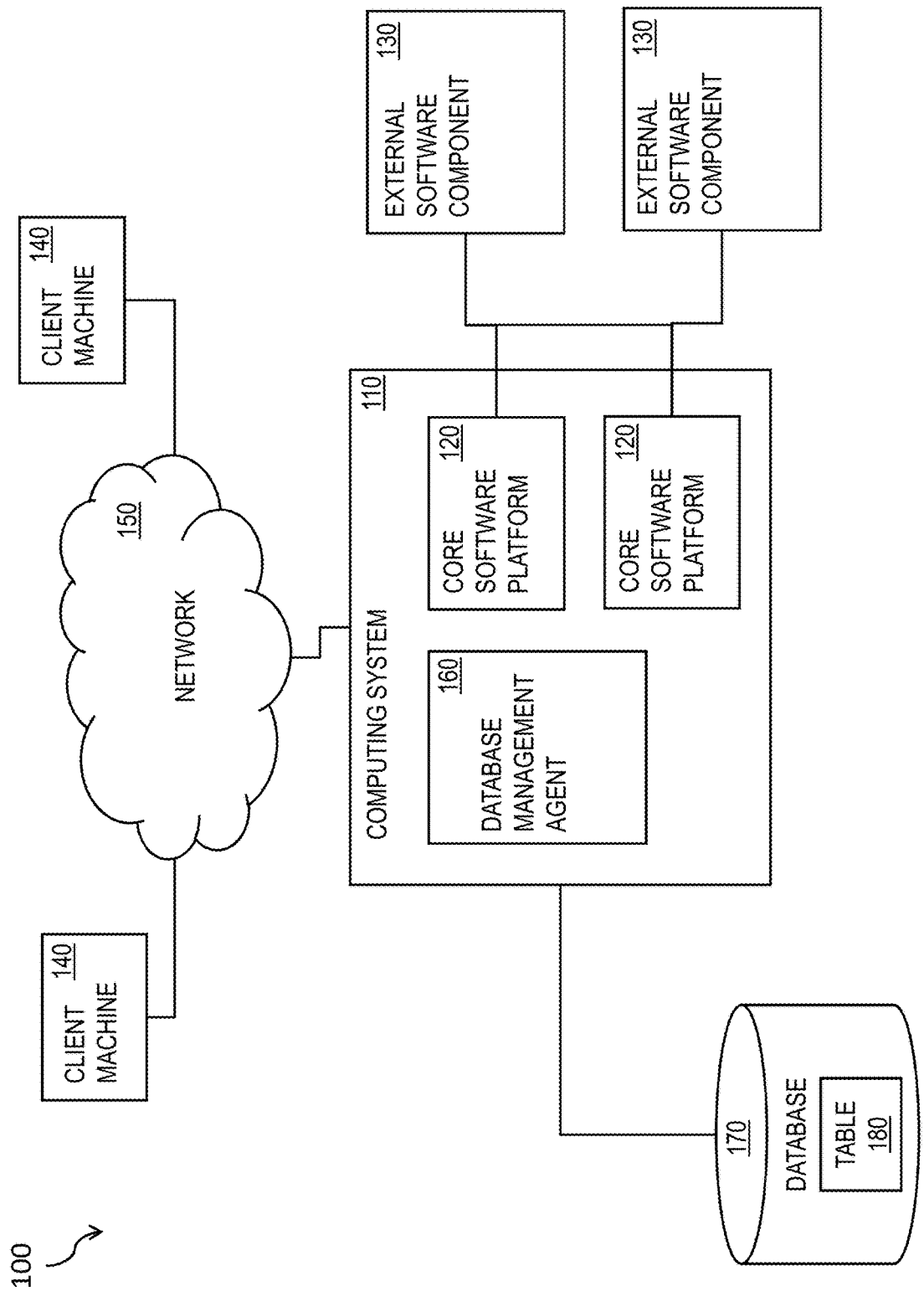
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like). The database management system 170 can include at least one table 180 and additionally include parallelization features consistent with those described herein.

Figure 2:
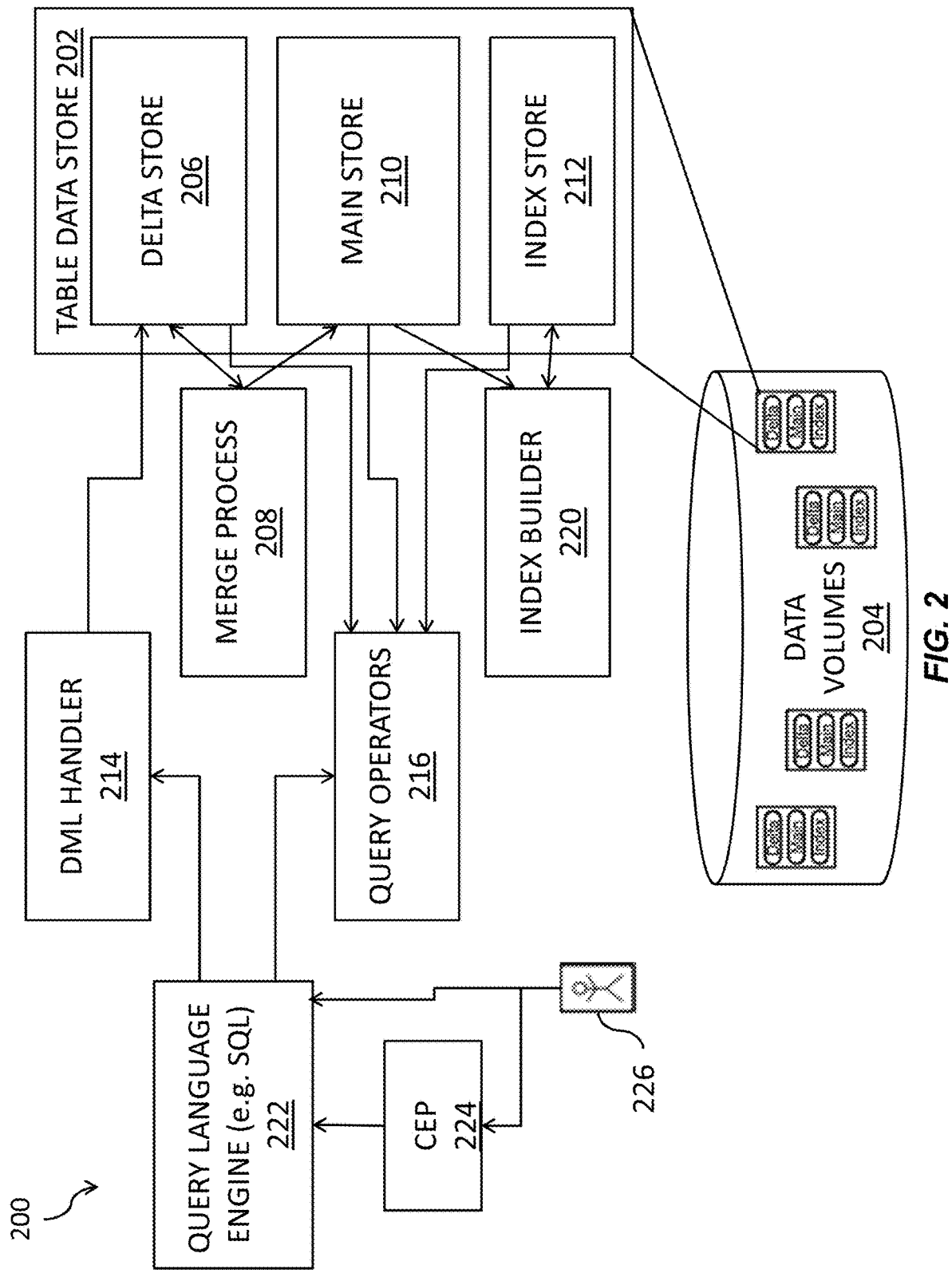
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
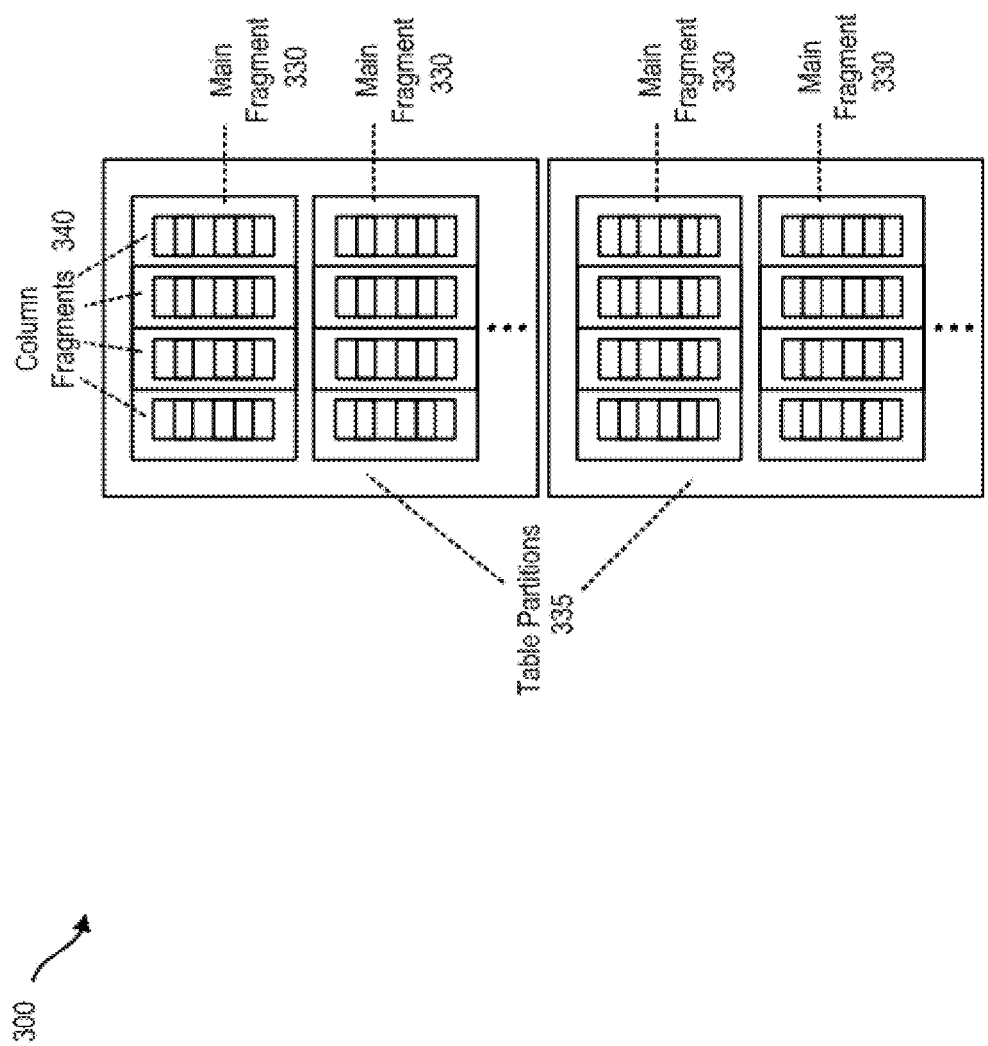
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
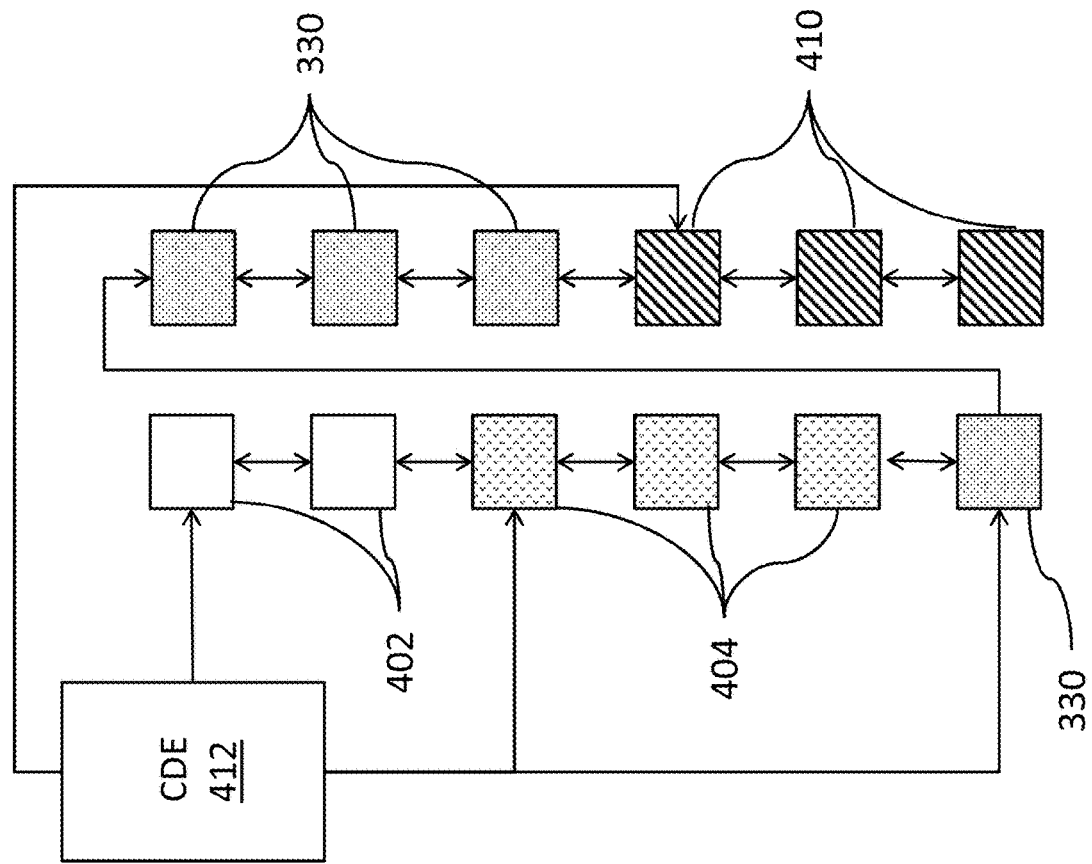
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like. While FIG. 4 illustrates a single page chain 400, multiple page chains can be used. In some implementations, the multiple page chains can be arranged in accordance with a hierarchy.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Each row has versioning information that controls which transactions can see the row. This versioning information can include, for example, a status identifier representative of the row's state, a create time stamp (CTS), a delete timestamp (DTS), and the like. The row's state can be invisible or always visible. In some implementations, the row's state can also indicate whether the row's CTS value should be checked or whether the row's CTS and DTS values should be checked. A row is initially invisible (i.e., cannot be seen by other transactions). When a thread performs a transaction, the row can receive a temporary CTS. This temporary CTS may only be visible to the thread. When the transaction is committed, a permanent CTS can be added to the row's versioning information. Adding the permanent CTS to the row's versioning information allows the row to become visible to newer (i.e., more recent) transactions. Upon doing so, the row's state may indicate that its CTS value should be checked. When a thread performs a transaction to delete a row, the row can receive a temporary DTS. This temporary DTS may only be visible to the thread. At this point, the deleted row may still be visible to other threads. When the deletion is committed, the row can receive a permanent DTS and the row's state can be changed to check the CTS and the DTS. Upon commitment, this row may no longer be visible to other threads.

Figure 5:
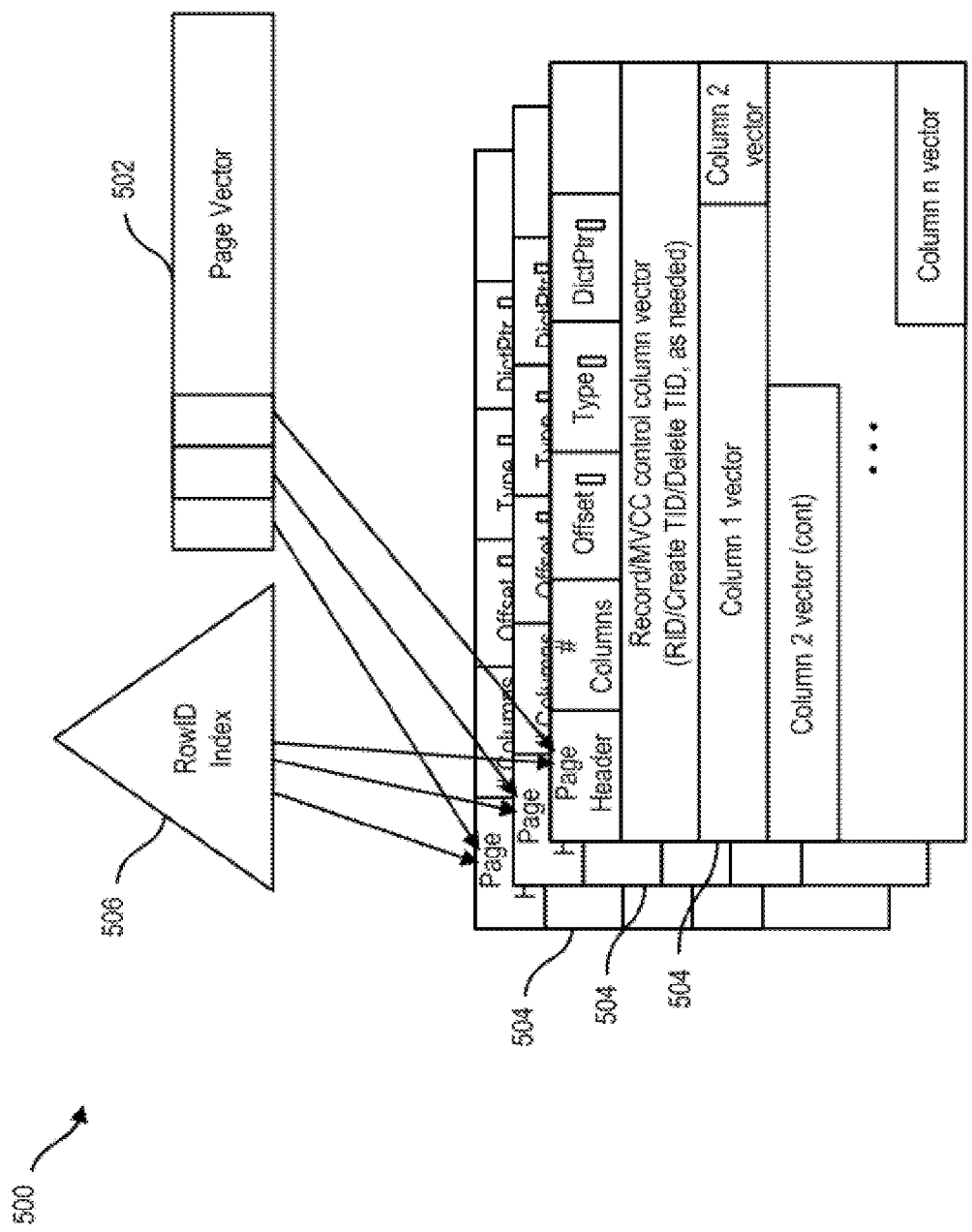
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
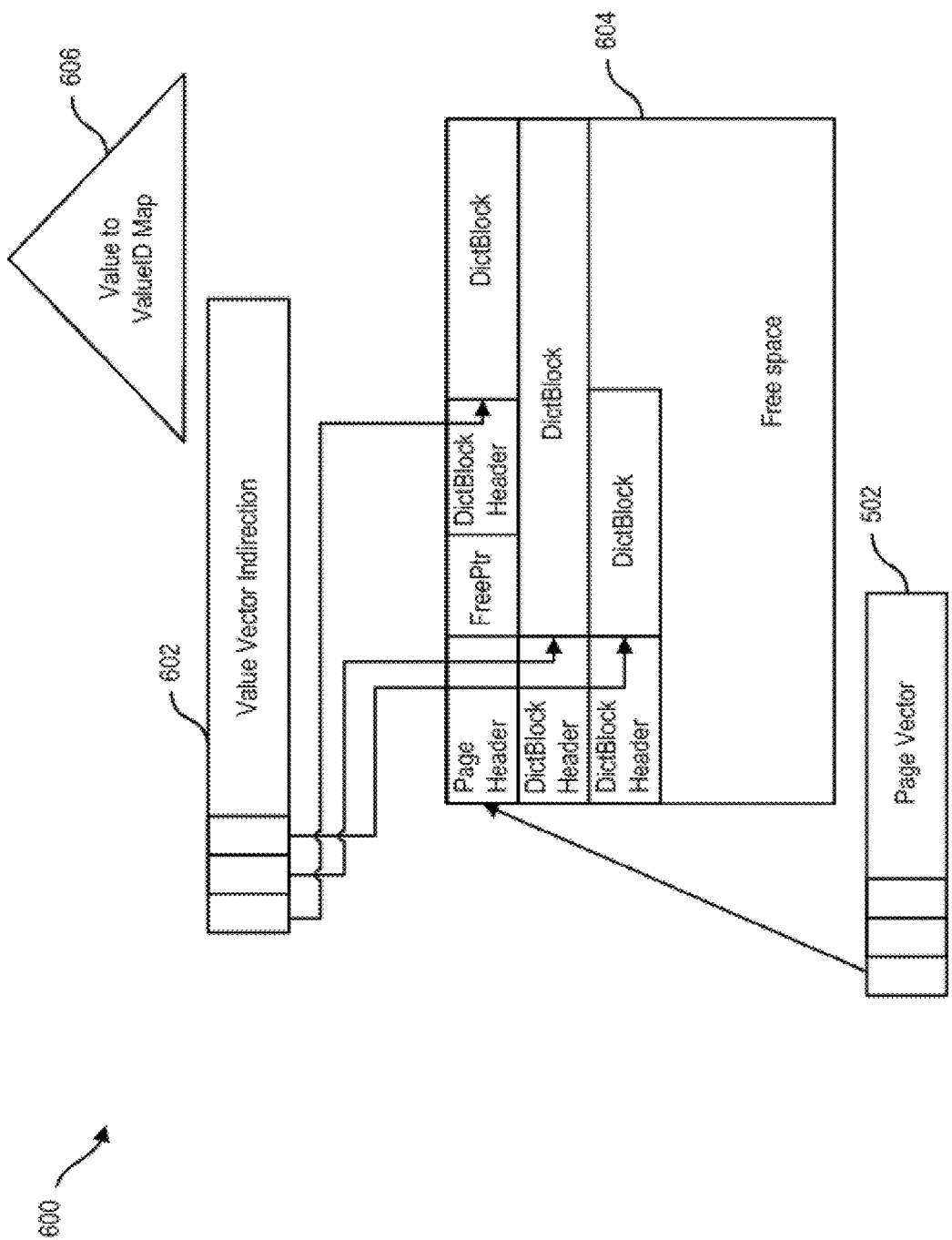
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
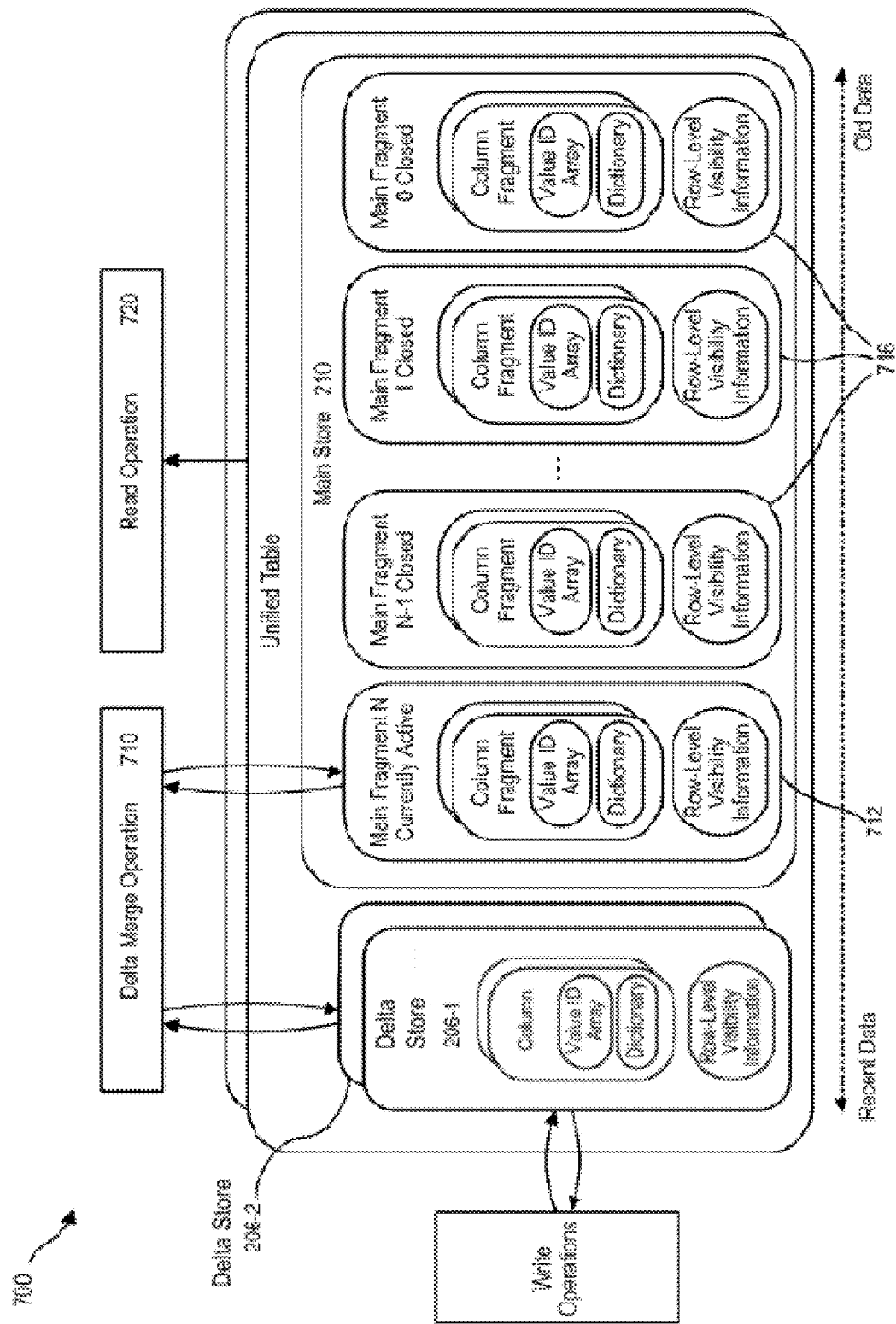
FIG. 7 is a functional block diagram illustrating a delta merge operation and a read operation using a unified table.

FIG. 7 shows a functional block diagram 700 for performing a read operation 720 on a unified table. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Functional block diagram 700 also illustrates a delta merge operation 710. New transactions or changes can initially be written into delta store. In some implementations, the delta store can include one or more stores, such as delta store 206-1 and delta store 206-2. Write operations can be initially written to delta store 206-1.

Figures 8, 9:
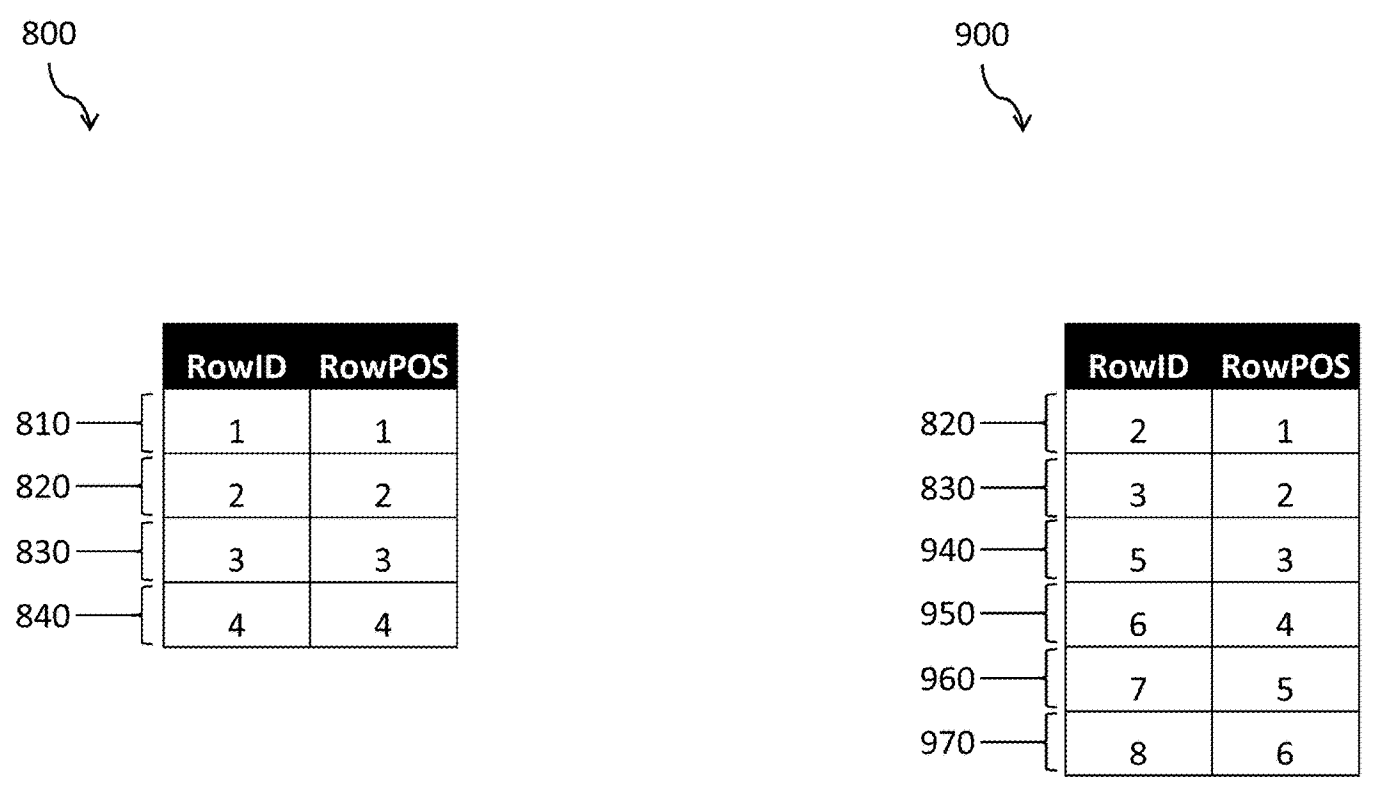

The core software platform 120 can assign row identifier (RowID) values and row position (RowPOS) values to each write operation. FIG. 8 shows a table 800 of sample RowID values and sample RowPOS values for a plurality of write operations. As described above with respect to FIG. 4, the RowID value can represent a row's logical position, and the RowPOS value can represent the row's physical location. The core software platform 120 can assign RowID values and RowPOS values to operations on a sequential basis. For example, when the client machine 140 initiates write operation 810, the core software platform 120 can assign a RowID value of 1 and a RowPOS value of 1 to this operation. When the client machine 140 (or any other client machine) initiates a new write operation 820, the core software platform 120 can assign the next available RowID and RowPOS. In the implementation of FIG. 8, write operation 820 can have a RowID value of 2 and a RowPOS value of 2. The core software platform 120 can assign RowID values and RowPOS values for write operations 830 and 840 in a similar manner. The write operations described herein can be associated with the addition or insertion of new data. In some implementations, however, write operations can include deletions. Unlike a data insertion which can be assigned a RowID value, deletions may not receive a RowID value.

During the delta merge operation 710, write operations that are committed can be persisted from delta store 206-1 into an in-memory database. In some implementations, the in-memory database can be stored at main store 210. In the implementation of FIG. 8, for example, write operations 810 and 840 can be committed and directly persisted to main store 210. Main store 210 can include one active fragment 712 and one or more closed fragments 716. When updates are merged from delta store 206-1 into the main store 210, existing records in the closed fragments 716 cannot be changed. Instead, new versions of the records can be added to the active fragment 712, and old versions can be marked as invalid.

Core software platform 120 can copy uncommitted write operations (e.g., write operations 820 and 830) from delta store 206-1 to delta store 206-2. FIG. 9 shows a table 900 of RowID and RowPOS assignments for write operations stored in delta store 206-2. Because a RowID value represents the logical position of a row and, consequently, is immutable, the RowID values for write operations 820 and 830 remain the same (i.e., 2 and 3, respectively). However, the core software platform 120 can update the RowPOS values for write operations 820 and 830 to reflect their new positions in delta store 206-2. Since write operation 820 is the first entry in delta store 206-2, the core software platform 120 can assign a RowPOS value of 1 to this operation. Similarly, the core software platform 120 can assign a RowPOS value of 2 to write operation 830 to indicate that it is the second entry in delta store 206-2.

As the client machine 140 initiates new write transactions, the core software platform 120 can log these new transaction in delta store 206-2. For example, when the client machine 140 initiates write operation 940, the core software platform 120 can assign the next available RowID value and RowPOS value. With regard to the former, the core software platform 120 previously assigned a RowID value of 4 to operation 840. Accordingly, the next available RowID value (i.e. 5) can be assigned to write operation 940. With regard to the latter, the core software platform 120 can assign a RowPOS value of 3 to operation 940 to indicate that this operation is the third entry in delta store 206-2. RowID values and RowPOS values can be assigned to write operations 950, 960, and 970 in a similar manner.

The RowID assignments of table 900 can be stored in a RowID dictionary 1000 as illustrated in FIG. 10A. Like dictionary 600 illustrated in FIG. 6, dictionary 1000 can assign a unique ValueID to each RowID. In some implementations, RowID dictionary 1000 can be a pushback dictionary. In a pushback dictionary, ValueIDs can be assigned to RowIDs based on the order in which the RowIDs are written to the dictionary. In the implementation of FIG. 10A, for example, ValueID values 0, 1, 2, 3, 4, and 5 are assigned to RowID values 2, 3, 5, 8, 6, and 7, respectively.

As evident from FIG. 10A, dictionary entries 1020, 1025, and 1030 may appear out of order because their corresponding RowID values are not placed in increasing order like dictionary entries 1005, 1010, and 1015. For example, dictionary entry 1020 (which has a RowID value of 8) can be added to dictionary 1000 before dictionary entry 1025 (which has a RowID value of 6). Similarly, dictionary entry 1025 (which has a RowID value of 6) can be added to dictionary 1000 before dictionary entry 1030 (which has a RowID value of 7). It may be desirable to sort dictionary 1000 such that the RowID values appear in sequential order (i.e., RowID values are either all increasing or all decreasing). Doing so can enable fast lookup of desired RowID values.

FIG. 10B illustrates a sorted dictionary 1040. Unlike the pushback dictionary 1000, which has out of sequence RowID values, dictionary 1040 can have sequentially sorted RowID values. In the implementation of FIG. 10B, for example, dictionary entries 1005, 1010, 1015, 1045, 1050, and 1055 can have sequentially increasing RowID values 2, 3, 5, 6, 7, and 8, respectively. In order to generate the sorted dictionary 1040, the core software platform 120 can map each RowID value to an appropriate ValueID value, such that the corresponding RowIDs are placed in sequential order in the dictionary. In sorted dictionary 1040, for example, the RowID values are arranged in increasing sequential order. In some implementations, a decreasing sequential order can be used. The core software platform 120 can perform this mapping using the following equation:

New ValueID=(Incoming RowID−Base RowID)+
   Base ValueID          (Equation 1)

In Equation 1, the New ValueID can represent the correct location at which an Incoming RowID should be added to dictionary 1040. Placing the Incoming RowID at the location represented by New ValueID can yield the sequential ordering illustrated in FIG. 10B. The New ValueID can be a function of two base values (i.e., the Base RowID and a Base ValueID). The Base RowID and the Base ValueID can correspond to the starting point of a consecutive sequence of RowID values that follow a committed transaction (e.g., a committed write operation). In some implementations, these base values immediately follow the committed transaction without any intervening operations. The difference between the Incoming RowID and the Base RowID can represent an offset of dictionary entries. This offset can be added to the Base ValueID in order to determine the New ValueID.

In the implementation of FIG. 10B, for example, the Base ValueID value is 2, and the RowID value is 5. This base pair represents the starting point of a consecutive sequence of RowID values 5, 6, 7, and 8 at dictionary entries 1015, 1045, 1050, and 1055, respectively. This base pair follows a committed transaction (i.e., previously committed write operation 840 having a RowID value of 4, as described above with respect to FIG. 8).

The core software platform 120 can use Equation 1 to determine the correct insertion point for write operations within the consecutive sequence. For example, in FIG. 10A, dictionary entry 1020 can be out of sequence because its RowID value (i.e., 8) is greater than the RowID value in dictionary entry 1025 (i.e., 6). Substituting the Incoming RowID value (i.e., 8), Base RowID value (i.e., 5), and Base ValueID value (i.e., 2) into Equation 1, the core software platform 120 can determine that the new ValueID value for this operation is 5. As such, the core software platform 120 can insert this RowID value into entry 1055 in dictionary 1040 as illustrated in FIG. 10B. The core software platform 120 can perform a similar calculation to determine the correct insertion point for incoming RowID values 6 and 7 to yield the sequentially ordered RowID values in dictionary 1040.

The base pair can split dictionary 1040 into at least two sections—a persisted section and a transient section. The persisted section can include dictionary entries above the base pair. The transient section can include the base pair and dictionary entries below the base pair (i.e., dictionary entries within the consecutive sequence). In the implementation of FIG. 10B, the persisted section can include dictionary entries 1005 and 1010, and the transient section can include dictionary entries 1015, 1045, 1050, and 1055.

Unlike traditional dictionaries which persist and materialize all of the entries in the dictionary into memory, the bifurcated organization in dictionary 1040 can optimize memory storage by persisting only the entries in the persisted section. In some implementations, the entries in the persisted section can be persisted or saved to an in-memory database. In some implementations, the in-memory database can be stored at main store 210. It may be unnecessary to persist or materialize the dictionary entries in the transient section, however, because the entries in this section can be easily reconstructed using Equation 1 as described above (i.e., the ValueID for each RowID can be easily determined using Equation 1). In some implementations, the base values in the transient section can be persisted the in-memory database as metadata. This metadata can be stored in the persisted descriptor of the fragment to which the base values belong. The persisted descriptor can include additional information associated with the fragment including, for example, the table that the fragment is associated with, the smallest and largest RowID value in the fragment, and the like. In some implementations, the number of values in the transient section can also be persisted. Doing so allows the core software platform 120 to reconstruct the transient portion to the proper size. While the implementation of FIG. 10B only includes one persisted section and one transient section, other variations are possible including, for example, the presence of two or more persisted sections, the presence of two or more transient sections, or both. These additional configurations can arise when the dictionary includes two or more base pairs of values.

In addition to the memory related advantages described above, the bifurcated nature of dictionary 1040 also makes efficient use of CPU resources during write operations and search or lookup operations. In an unsorted dictionary, such as dictionary 1000, an index structure may be needed to search the dictionary. Doing so, however, can expend unnecessary memory and processing resources to maintain the index (i.e., during insertion time) and to traverse the index when a search is performed. Dictionary 1040, however, may not need an index for its transient section because the entries in this section can be easily reconstructed using Equation 1. Eliminating this index can reduce the amount of resources otherwise needed to maintain and search the index.

Equation 1 allows the core software platform 120 to quickly determine the ValueID for a RowID value within the transient section of the dictionary. Sometimes, however, the core software platform 120 may need to read data from the persisted section of the dictionary. For example, if the core software platform 120 receives a read operation for a RowID value that is less than the base RowID value, then the core software platform can deduce that the desired RowID value is in the persisted section of the dictionary. The core software platform 120 can use various search mechanisms to find the desired RowID and its corresponding ValueID within the persisted section. These search mechanisms can include, for example, a binary search, a hash table search, and the like. The search mechanism that is used can depend on various factors including, for example, whether the dictionary entries in the persisted section are sorted based on each entry's RowID value. Whether a dictionary is sorted can be indicated using a persisted dictionary descriptor. This descriptor can include metadata which indicates, for example, the data types stored in the dictionary, whether the persisted section of the dictionary is sorted or unsorted, and the like. The core software platform 120 can check the persisted dictionary descriptor to determine which search mechanism to use.

When the persisted section is sorted by RowID value (e.g., in increasing order), the core software platform 120 can use a binary search. In a binary search, the core software platform 120 can locate the RowID value in the middle of the persisted section and compare this RowID value to the desired RowID value. If the desired RowID value is less than this middle RowID value, then the core software platform 120 can repeat the above comparison on the sub-section of RowID values above the middle RowID value until the desired RowID value is found. If, however, the desired RowID value is greater than the middle RowID value, then the core software platform 120 can repeat the above comparison on the sub-section of RowID values below the middle RowID value until the desired RowID value is found.

When the persisted section is not sorted, the core software platform 120 can perform a hash table search. As described above with respect to FIG. 6, dictionary entries can be stored in a hash table. The core software platform 120 can search this hash table to find the desired RowID value using known techniques. In order to reduce the search time and to minimize the amount of storage required by the hash table, only persisted dictionary entries can be stored in the hash table. However, in some implementations, the hash table can include dictionary entries from both the persisted section and the transient section.

Additional operations can be performed on dictionary 1040. In some implementations, the core software platform 120 may need to find the corresponding row position (i.e., the RowPOS value) for a given RowID value. As described above, the core software platform 120 can assign RowPOS values to write operations. However, these values can change when a merge operation occurs. For example, when write operation 830 is copied from delta store 206-1 to delta store 206-2, its RowPOS value can change from 3 to 2, as described above with respect to FIGS. 8 and 9. In order to track these changes, the delta store 206-2 can maintain an index dictionary that correlates ValueIDs values to RowPOS values.

FIG. 11 shows an exemplary index dictionary 1100 for delta store 206-2. The core software platform 120 can use index dictionary 1100 in combination with RowID dictionary 1040 to determine the RowPOS value of a desired RowID value. For example, if the core software platform 120 needs to find the current row position of a write operation having a RowID value of 6, the core software platform can first determine this operation's corresponding ValueID from dictionary 1040. Since the desired RowID value is greater than the Base RowID value, then the core software platform 120 can deduce that this RowID value resides within the transient section of the dictionary 1040. As such, the core software platform 120 can use equation 1 to determine the corresponding ValueID (i.e., 3). Upon making this determination, the core software platform 120 can then find the corresponding RowPOS value using index dictionary 1100. As illustrated in the implementation of FIG. 11, the corresponding RowPOS value for the determined ValueID is 12.

Figure 12:
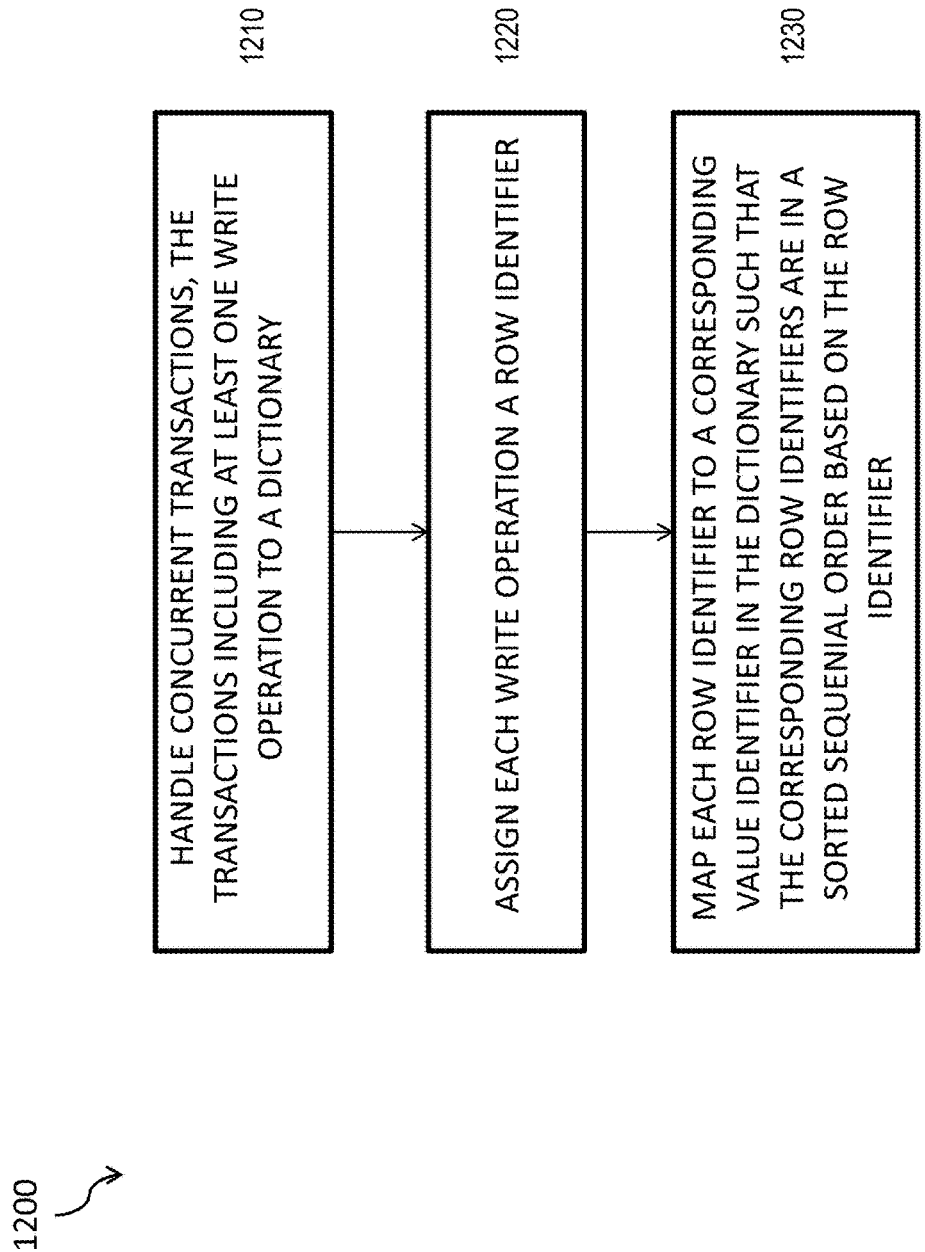
FIG. 12 is a flowchart for ordering a dictionary based on row identifier values.

FIG. 12 illustrates a flowchart for ordering a dictionary based on its RowID values. At 1210, a core software platform 120 can handle a plurality of concurrent transactions. These transactions can include at least one write operation to a dictionary, such as dictionary 1000 illustrated in FIG. 10A.

At 1220, the core software platform 120 can assign each write operation a row identifier, such as a RowID value. The write operations can be written to the dictionary out of sequence. In the implementation of FIG. 10A, dictionary 1000 can be a pushback dictionary. As such, write operations can be added to the dictionary based on the order in which they arrive. Write operations 1020, 1025, and 1030 can be out of sequence as evidenced by their respective RowID values.

At 1230, the core software platform 120 can map each row identifier in the dictionary to a corresponding value identifier in the dictionary. This mapping can be performed in accordance with Equation 1 as described above with respect to FIG. 10B. Based on this mapping, the value identifiers can be arranged such that their corresponding row identifier values appear in a sorted sequential order, as illustrated in dictionary 1040.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:

in response to an initiation of a first write operation to an in-memory database, writing, to a dictionary, the first write operation, the dictionary tracking transactions operating on the in-memory database by at least providing mappings between at least one row identifier (ID) and a corresponding value identifier (ID), the writing of the first write operation comprising:

assigning, to the first write operation, a first row identifier (ID);

determining that the first row ID is out of sequence relative to a second row ID in the dictionary, the second row ID being associated with a second write operation to the in-memory database; and in response to the first row ID being determined to be out of sequence relative to the second row ID, mapping, based at least on a base row ID and a base value ID, the first row ID to a first value ID in the dictionary and the second row ID to a second value ID in the dictionary such that the first row ID and the second row ID are in a sorted sequential order in the dictionary, the base row ID and the base value ID corresponding to a row ID and value ID at a starting point of a sequence of consecutive row IDs following a committed write operation, the first value ID corresponding to a first sum of the base value ID and a first offset between the first row ID and the base row ID, and the second value ID corresponding to a second sum of the base value ID and a second offset between the second row ID and the base row ID; and completing, based at least on the dictionary, one or more concurrent transactions operating on the in-memory database.

2. The method of claim 1, wherein the the sequence of consecutive row IDs comprises a transient portion of the dictionary, and wherein the base row ID and the base value ID are further representative of a starting point of the transient portion of the dictionary.

3. The method of claim 2, wherein the base row ID and the base value ID are persisted to the in-memory database, and wherein the remaining plurality of consecutive row IDs are not persisted to the in-memory database.

4. The method of claim 3, further comprising:

persisting a number of values in the transient portion to the in-memory database.

5. The method of claim 2, wherein the dictionary further comprises a persisted portion having a plurality of persisted row IDs.

6. The method of claim 5 further comprising searching the persisted portion for an incoming row ID using a search mechanism.

7. The method of claim 6, wherein the search mechanism is a binary search when the plurality of persisted row IDs are ordered, and wherein the search mechanism is a hash table search when the plurality of persisted row IDs are not ordered.

8. The method of claim 1, further comprising:
determining the first value ID by at least determining the first offset between the first row ID and the base row ID before adding the first offset to the base value ID; and
determining the second value ID by at least determining the second offset between the second row ID and the base row ID before adding the second offset to the base value ID.

9. The method of claim 1, further comprising:
inserting, into the dictionary, the first row ID and the first value ID based at least on the mapping.

10. The method of claim 1, further comprising:
obtaining a row position value for the first row ID by at least searching an index dictionary based on the first value ID, the index dictionary providing mappings between at least one value ID associated with a row ID and a corresponding row position value.

11. The method of claim 1 wherein the first write operation and/or the second write operation are associated with an insertion of data but not a deletion of data.

12. A non-transitory computer-readable medium containing instructions to configure a processor to perform operations comprising:
in response to an initiation of a first write operation to an in-memory database, writing, to a dictionary, the first write operation, the dictionary tracking transactions operating on the in-memory database by at least providing mappings between at least one row identifier (ID) and a corresponding value identifier (ID), the writing of the first write operation comprising:
assigning, to the first write operation, a first row identifier (ID);
determining that the first row ID is out of sequence relative to a second row ID in the dictionary, the second row ID being associated with a second write operation to the in-memory database; and
in response to the first row ID being determined to be out of sequence relative to the second row ID, mapping, based at least on a base row ID and a base value ID, the first row ID to a first value ID in the dictionary and the second row ID to a second value ID in the dictionary such that the first row ID and the second row ID are in a sorted sequential order in the dictionary, the base row ID and the base value ID corresponding to a row ID and value ID at a starting point of a sequence of consecutive row IDs following a committed write operation, the first value ID corresponding to a first sum of the base value ID and a first offset between the first row ID and the base row ID, and the second value ID corresponding to a second sum of the base value ID and a second offset between the second row ID and the base row ID; and
completing, based at least on the dictionary, one or more concurrent transactions operating on the in-memory database.

13. The non-transitory computer-readable medium of claim 12, wherein the the sequence of consecutive row IDs comprises a transient portion of the dictionary, and wherein the base row ID and the base value ID are further representative of a starting point of the transient portion of the dictionary.

14. The non-transitory computer-readable medium of claim 13, wherein the base row ID and the base value ID are persisted to the in-memory database, wherein the remaining plurality of consecutive row IDs are not persisted to the in-memory database, and wherein the dictionary further comprises a persisted portion having a plurality of persisted row IDs.

15. The non-transitory computer-readable medium of claim 12, further comprising:
determining the first value ID by at least determining the first offset between the first row ID and the base row ID before adding the first offset to the base value ID; and
determining the second value ID by at least determining the second offset between the second row ID and the base row ID before adding the second offset to the base value ID.

16. A system comprising:
at least one processor; and
at least one memory, wherein the at least one processor and the at least one memory are configured to perform operations comprising:
in response to an initiation of a first write operation to an in-memory database, writing, to a dictionary, the first write operation, the dictionary tracking transactions operating on the in-memory database by at least providing mappings between at least one row identifier (ID) and a corresponding value identifier (ID), the writing of the first write operation comprising:
assigning, to the first write operation, a first row identifier (ID);
determining that the first row ID is out of sequence relative to a second row ID in the dictionary, the second row ID being associated with a second write operation to the in-memory database; and
in response to the first row ID being determined to be out of sequence relative to the second row ID, mapping, based at least on a base row ID and a base value ID, the first row ID to a first value ID in the dictionary and the second row ID to a second value ID in the dictionary such that the first row ID and the second row ID are in a sorted sequential order in the dictionary, the base row ID and the base value ID corresponding to a row ID and value ID at a starting point of a sequence of consecutive row IDs following a committed write operation, the first value ID corresponding to a first sum of the base value ID and a first offset between the first row ID and the base row ID, and the second value ID corresponding to a second sum of the base value ID and a second offset between the second row ID and the base row ID; and
completing, based at least on the dictionary, one or more concurrent transactions operating on the in-memory database.

17. The system of claim 16, wherein the the sequence of consecutive row IDs comprises a transient portion of the dictionary, and wherein the base row ID and the base value ID are further representative of a starting point of the transient portion of the dictionary.

18. The system of claim 17, wherein the base row ID and the base value ID are persisted to the in-memory database, wherein the remaining plurality of consecutive row IDs are not persisted to the in-memory database, and wherein the dictionary further comprises a persisted portion having a plurality of persisted row IDs.

19. The system of claim 16, further comprising:
determining the first value ID by at least determining the first offset between the first row ID and the base row ID before adding the first offset to the base value ID; and determining the second value ID by at least determining the second offset between the second row ID and the base row ID before adding the second offset to the base value ID.

\* \* \* \* \*